(12) United States Patent
Johansson et al.

(10) Patent No.: US 10,602,445 B2
(45) Date of Patent: Mar. 24, 2020

(54) M2M SEMI-PERSISTENT SCHEDULING IN WIRELESS COMMUNICATIONS

(71) Applicant: MediaTek Inc., Hsinchu (TW)

(72) Inventors: Per Johan Mikael Johansson, Kungsängen (SE); Shiang-Jiun Lin, Hsinchu (TW); Li-Chuan Tseng, Hsinchu (TW); Gilles Charbit, Hampshire (GB)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 16/144,122

(22) Filed: Sep. 27, 2018

(65) Prior Publication Data

US 2019/0104470 A1    Apr. 4, 2019

Related U.S. Application Data

(60) Provisional application No. 62/565,204, filed on Sep. 29, 2017.

(51) Int. Cl.
*H04W 52/02* (2009.01)
*H04W 76/28* (2018.01)
(Continued)

(52) U.S. Cl.
CPC ..... *H04W 52/0216* (2013.01); *H04W 72/042* (2013.01); *H04W 72/0446* (2013.01);
(Continued)

(58) Field of Classification Search
CPC ............... H04W 72/04; H04W 72/042; H04W 72/0446; H04W 72/121; H04W 52/0216; H04W 76/14; H04W 76/28; H04W 4/70; H04W 74/0833; Y02D 70/00; Y02D 70/142; Y02D 70/144; Y02D 70/1262
See application file for complete search history.

(56) References Cited

U.S. PATENT DOCUMENTS

| 2011/0305215 A1 | 12/2011 | Hofmann et al. |
| 2015/0215097 A1* | 7/2015 | Yi .................. H04W 52/48 370/329 |

(Continued)

FOREIGN PATENT DOCUMENTS

| CN | 102014480 A | 4/2011 |
| CN | 103889039 A | 6/2014 |

(Continued)

OTHER PUBLICATIONS

State Intellectual Property Office of China, International Search Report and Written Opinion for International Patent Application No. PCT/CN2018/108611, dated Jan. 11, 2019.

(Continued)

*Primary Examiner* — Afsar M Qureshi
(74) *Attorney, Agent, or Firm* — Han IP PLLC; Andy M. Han

(57) ABSTRACT

Various examples and schemes pertaining machine-to-machine (M2M) semi-persistent scheduling (SPS) in wireless communications are described. A user equipment (UE) receives a control signal from a network node of a wireless network. The UE applies, based on the control signal, an SPS configuration such that the UE enters one of one or more low-power modes between two adjacent SPS occasions.

20 Claims, 4 Drawing Sheets

(51) Int. Cl.
*H04W 76/14* (2018.01)
*H04W 72/04* (2009.01)
*H04W 72/12* (2009.01)
*H04W 74/08* (2009.01)
*H04W 4/70* (2018.01)

(52) U.S. Cl.
CPC ......... *H04W 72/121* (2013.01); *H04W 76/14* (2018.02); *H04W 76/28* (2018.02); *H04W 4/70* (2018.02); *H04W 72/04* (2013.01); *H04W 74/0833* (2013.01)

(56) References Cited

U.S. PATENT DOCUMENTS

| | | | |
|---|---|---|---|
| 2017/0026942 A1* | 1/2017 | Vajapeyam | H04W 72/042 |
| 2017/0208612 A1 | 7/2017 | Tushar et al. | |
| 2018/0184439 A1* | 6/2018 | Lee | H04W 72/042 |
| 2018/0184443 A1* | 6/2018 | Li | H04W 72/1278 |
| 2019/0052996 A1* | 2/2019 | Sahai | H04W 76/28 |

FOREIGN PATENT DOCUMENTS

| | | | | |
|---|---|---|---|---|
| CN | 105592557 A | 5/2016 | | |
| WO | WO 2013169173 A1 | 11/2013 | | |
| WO | WO 20170782 A1 | 5/2017 | | |
| WO | WO-2017074805 A1 * | 5/2017 | ............. | G01C 11/02 |
| WO | WO-2017074806 A1 * | 5/2017 | ........ | H04W 52/0225 |
| WO | WO 2017074806 A1 | 5/2017 | | |

OTHER PUBLICATIONS

Taiwan Intellectual Property Office, Office Action for Taiwan Patent Application No. 107134485, dated Aug. 19, 2019.

\* cited by examiner

M2M SEMI-PERSISTENT SCHEDULING IN WIRELESS COMMUNICATIONS

CROSS REFERENCE TO RELATED PATENT APPLICATION(S)

The present disclosure is part of a non-provisional application claiming the priority benefit of U.S. Patent Application No. 62/565,204, filed on 29 Sep. 2017, the content of which is incorporated by reference in its entirety.

TECHNICAL FIELD

The present disclosure is generally related to wireless communications and, more particularly, to machine-to-machine (M2M) semi-persistent scheduling in wireless communications.

BACKGROUND

Unless otherwise indicated herein, approaches described in this section are not prior art to the claims listed below and are not admitted as prior art by inclusion in this section.

In wireless communication systems, in particular those in accordance with the $3^{rd}$-Generation Partnership Project (3GPP) specifications such as Long-Term Evolution (LTE), semi-persistent scheduling (SPS) SPS is typically used for connected mode and can only handle periodicities that are small. However, SPS in current 3GPP systems cannot be used for M2M regular meter reporting, especially when M2M meters tend to have very high requirements for battery life time and sometimes very sparse reporting periodicity. M2M devices with SPS also tend to be mostly stationary although could be moveable. Thus, significant novel modifications would be needed in order to make use of SPS for M2M regular reporting applications.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

The present disclosure proposes a number of schemes, solutions, techniques, methods and apparatuses pertaining to M2M SPS in wireless communications. It is believed that the proposed schemes, solutions, techniques, methods and apparatuses would result in increasing battery life for UEs as well as reducing signaling overhead, thereby improving overall system performance.

In one aspect, a method may involve a processor of a user equipment (UE) receiving a control signal from a network node of a wireless network. The method may also involve the processor applying, based on the control signal, an SPS configuration such that the UE enters one of one or more low-power modes between two adjacent SPS occasions.

In one aspect, an apparatus may include a transceiver and a processor coupled to the transceiver. The transceiver may be capable of wirelessly communicating with a network node of a wireless network. The processor may be capable of: (a) receiving, via the transceiver, a control signal from the network node; and (b) applying, based on the control signal, an SPS configuration such that the apparatus enters one of one or more low-power modes between two adjacent SPS occasions.

It is noteworthy that, although description provided herein may be in the context of certain radio access technologies, networks and network topologies such as Internet of Things (IoT) and narrowband IoT (NB-IoT), the proposed concepts, schemes and any variation(s)/derivative(s) thereof may be implemented in, for and by other types of radio access technologies, networks and network topologies such as, for example and without limitation, $5^{th}$ Generation, New Radio (NR), Long-Term Evolution (LTE), LTE-Advanced, LTE-Advanced Pro. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Figure 1:
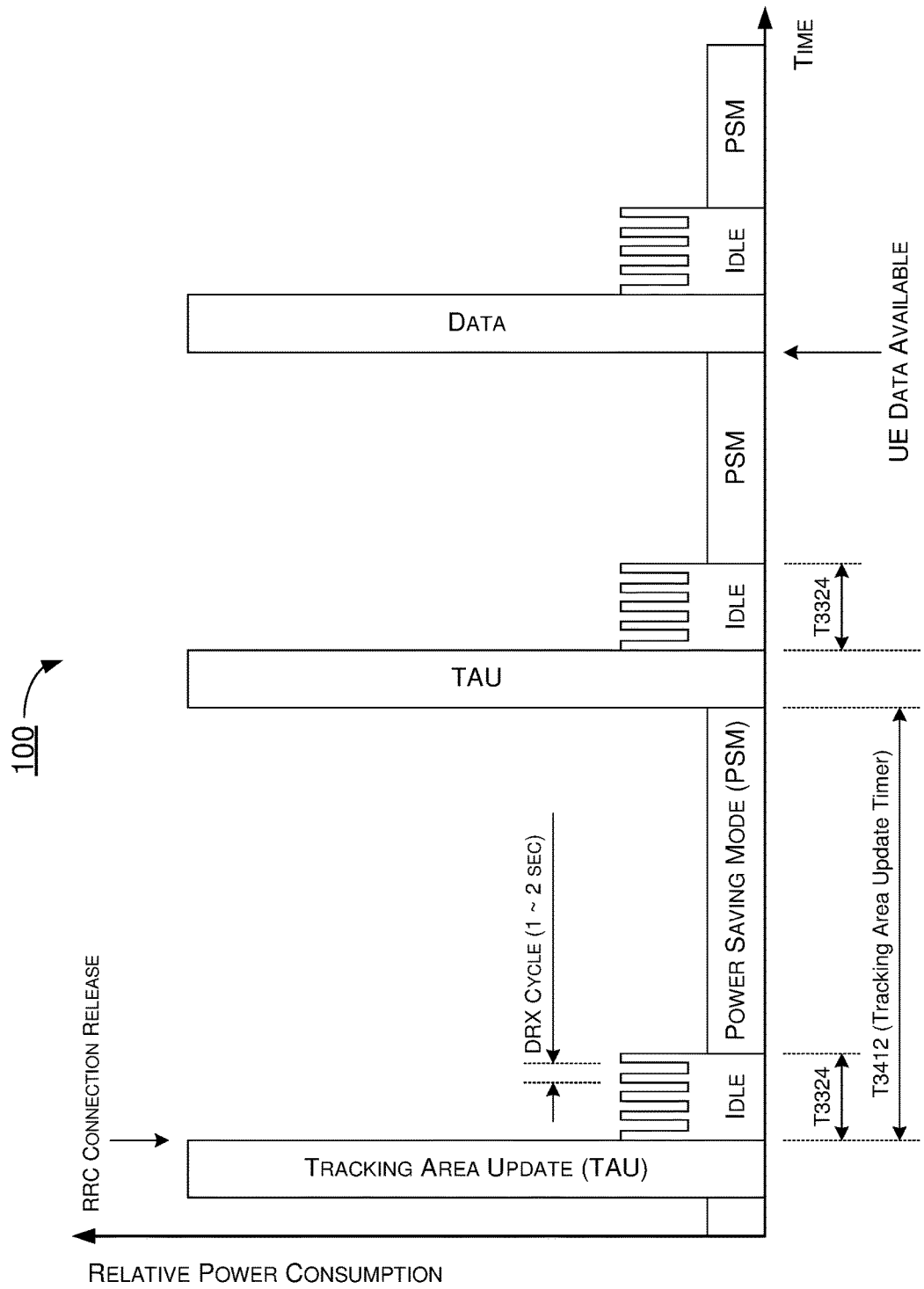
FIG. 1 is a diagram of an example scenario of M2M SPS in accordance with an implementation of the present disclosure.

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to M2M semi-persistent scheduling in wireless communications for reduction in signaling overhead and improvement in system performance. According to the present disclosure, a number of possible solutions may be implemented separately or jointly. That is, although these possible solutions may be described below separately, two or more of these possible solutions may be implemented in one combination or another.

It is noteworthy that there may be a number of assumptions under which proposed schemes in accordance with the present disclosure may be implemented. Firstly, M2M SPS is for uplink (UL) transmission from a UE to a network node (e.g., base station) of a network. Secondly, M2M SPS may need to support a wide range of periodicities, up to a magnitude time a number of hours between transmissions (e.g., greater than or equal to 12 hours), with the UE being in a "low-power mode", such as an idle mode, a power-saving mode (PSM) and/or an extended discontinuous reception (eDRX) mode and/or a DRX mode, between adjacent M2M SPS UL transmissions. In some cases, each of PSM, eDRX mode and DRX mode may be considered as special case of idle mode. Thirdly, M2M SPS may be used in conjunction with one or more procedures applied for early data transmission (EDT) and optionally optimizations for enhanced radio resource control (RRC) release. Moreover, M2M SPS may be at most applicable in a single cell and may result in skipping of physical random access channel (PRACH) and/or random access response (RAR) when the UE can reuse a previous UL timing advance (TA) value. For instance, the UE may not assume any new layer 1 (L1) UL channel that can work without TA. As such, a majority of UEs for which the proposed scheme may be implemented may be stationary and/or low-mobility/semi-stationary UEs. Furthermore, M2M SPS may be utilized for regular UL transmissions. For urgent or high priority or irregular transmissions (e.g., higher-priority alarms), the UE may use normal access by a random access channel (RACH).

It is believed that those with ordinary skill in the art would appreciate a number of benefits provided by M2M SPS. For instance, with M2M SPS, the problem of EDT failed contention transmission with a relatively long transmission (e.g., due to a large number of message repetitions required in bad coverage) may be avoided. Advantageously, both UE power consumption and UL resource utilization may be enhanced. Additionally, for stationary UEs that can use a previous TA, transmissions such as the PRACH-plus-RAR transmissions may be avoided.

Support of Long-Period SPS

Under a proposed scheme in accordance with the present disclosure, both a UE and a network node (e.g., base station) to which the UE is communicatively connected may have a SPS configuration that is kept in a low-power mode, which may be one of the following: idle mode, PSM and/or eDRX mode and/or DRX mode.

Under the proposed scheme, the PSM may be configured by non-access stratum (NAS) signaling that allows the UE to reduce its power consumption. That is, PSM is a UE-implemented mechanism to reduce power consumption by the UE. Additionally, the UE may report how often and for how long the UE needs to be active in order to transmit and receive data. The final values for how often and for how long the UE needs to be active may be determined by the network. It is noteworthy that PSM may be similar to power-off, but the UE may remain registered with the network while in PSM. When the UE becomes active again from PSM there is no need for the UE to re-attach or re-establish packet data network (PDN) connections. The UE may request PSM by including a timer with a desired value in an attach, tracking area update (TAU) or routing area update sent to the network. The maximum time for which a UE may sleep while in PSM is approximately 413 days (set by 3GPP Release 13 for T3412). The maximum time for which a UE may be reachable while in PSM is 186 minutes (an equivalent of the maximum value of the active timer specified in T3324).

FIG. 1 illustrates an example scenario 100 of M2M SPS applied by or in a UE in accordance with an implementation of the present disclosure. In scenario 100, the UE transitions from one mode to another, including: from idle mode to PSM, from PSM to connected mode (e.g., for TAU), and from connected mode to idle mode. The duration in which the UE stays in idle mode may be predefined (e.g., according to the 3GPP specification in T3324). Similarly, the duration between two adjacent SPS occasions (e.g., two adjacent TAUs) may be predefined (e.g., according to the 3GPP specification in T3412) or dynamically adjusted (e.g., entering connected mode when data becomes available for transmission). While in idle mode, the UE may be in a number of DRX cycles.

Figure 2:
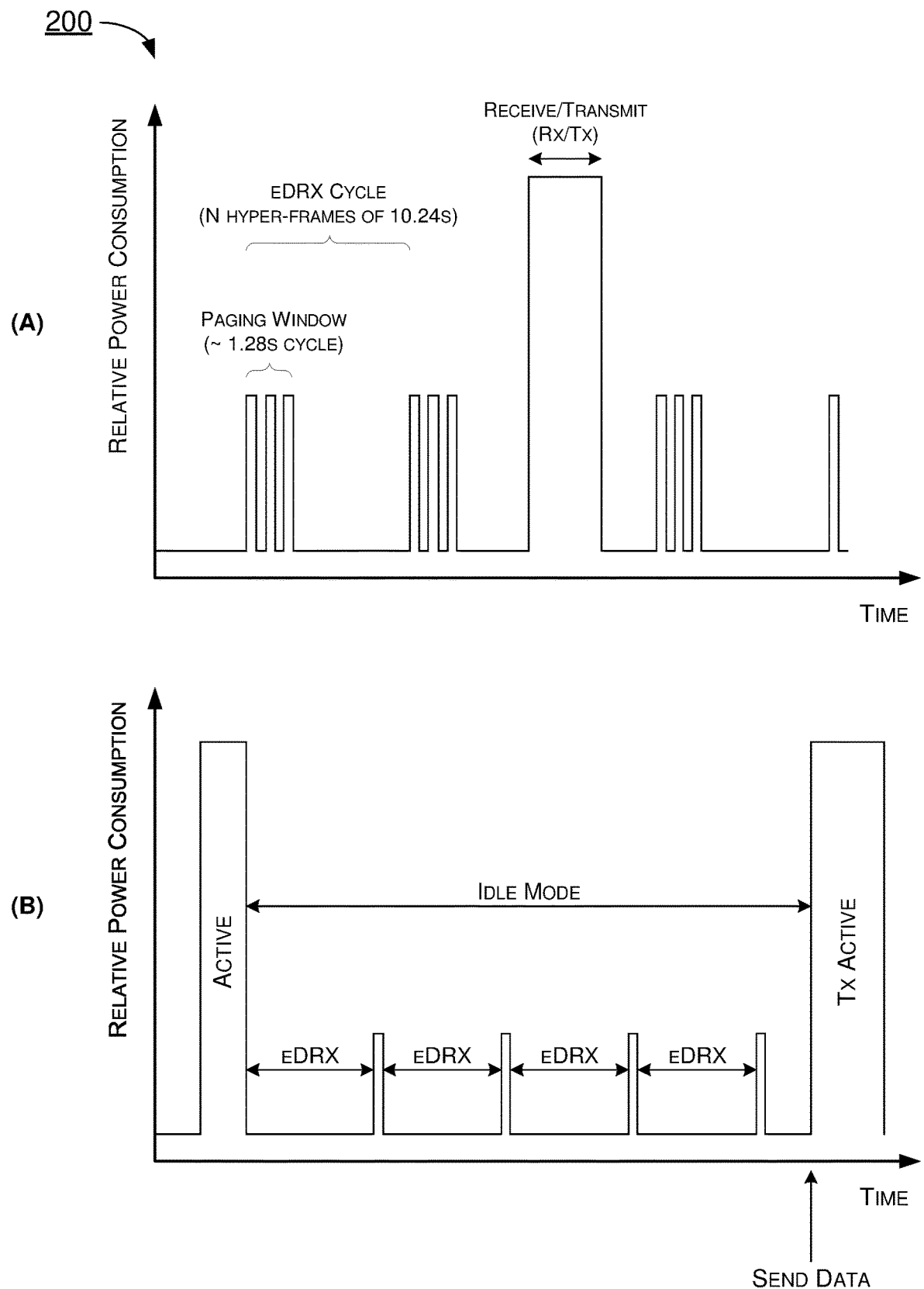
FIG. 2 is a diagram of an example scenario of M2M SPS in accordance with an implementation of the present disclosure.

Under the proposed scheme, eDRX mode may allow IoT devices to remain inactive for longer periods of time. Extended discontinuous reception cycles may provide UEs longer inactive periods between reading, paging and/or controlling channels. FIG. 2 illustrates an example scenario 200 of M2M SPS in accordance with an implementation of the present disclosure. When in eDRX mode, a UE merely needs to monitor paging when in the paging transmission window (PTW), as shown in part (A) of FIG. 2. During the PTW, the UE may monitor paging for the duration of the PTW (as configured by NAS) or until a paging message including the UE's NAS identity is received for the UE, whichever is earlier. Outside the PTW, the UE may stay in an inactive state without paging monitoring. Part (B) of FIG. 2 shows that there may be multiple periods of eDRX mode in one period of idle mode between two adjacent SPS occasions (e.g., when one or more transmitters of the UE become(s) activated to transmit data upon the UE leaving the low-power mode).

Under the proposed scheme, a transition from idle mode to a connected mode triggered by data becoming available in buffers of the UE (e.g., for UL transmission) may be prevented for regular UL M2M transmissions when there is a valid SPS configuration. That is, NAS needs to be aware of this situation. Moreover, the transition from idle mode to connected mode may be postponed until there is an SPS occasion in the access stratum (AS). Under the proposed scheme, whether or not to postpone the mode transition may depend on the NAS access cause value.

Under the proposed scheme, a TA timer and TA may be maintained by the UE in the idle mode. For the maintenance of TA value for UL transmissions, the network may configure a TA validity timer to a UE capable of idle-mode SPS and such TA validity timer may be kept counting when the UE returns to the idle mode. The TA validity timer may be set to infinite for a stationary UE for which the TA value is considered valid all the time.

Under the proposed scheme, for a UE that does not have a valid TA, there may be a number of options. Under a first option, when TA timer expires, the SPS configuration may be invalidated. Under a second option, the UE may need to perform a RACH procedure before an SPS occasion for the UE to acquire TA.

Under the proposed scheme, a time reference that is valid (e.g., greater than or equal to 12 hours) may be used. For instance, a hyper-system frame number (H-SFN) may be extended to support the time reference. The H-SFN is a timer at a next level to system frame number (SFN). The value of H-SFN may range between 0 and 1023, and the value may be incremented by 1 when SFN reaches 1023 and reset to 0.

The maximum time for H-SFN is 10,485,760 milliseconds (ms), 10,485.76 seconds or approximately 2.91 hours. A super hyper SFN (SH-SFN) is a timer that is at the next level to H-SFN. The value of SH-SFN may range between 0 and 1023, and the value may be incremented by 1 when H-SFN reaches 1023 and reset to 0.

With respect to the validity of SPS in idle mode configuration, one approach may be to keep the validity "forever" until the configuration is explicitly removed. However, this approach may be impractical as there may need to be special rules regarding when the configuration is applicable. Moreover, there may need to be functions to ensure that configurations of the UE and the network node (e.g., base station) are consistent. Under the proposed scheme, the validity of SPS may be kept valid for a single SPS transmission opportunity or, alternatively, may be valid for as long as the UE is kept in idle mode. For instance, the validity of SPS may be reconfigured at every transmission or at every transition from idle mode to connected mode. Under the proposed scheme, the validity of SPS may be disabled in the UE in an event that the UE resides in another cell when an SPS occasion occurs. The validity of SPS may also be disabled in the base station when the US has moved to another cell. Under the proposed scheme, the SPS configuration may not be applicable in connected mode. For instance, an SPS configuration valid for a low-power mode may remain valid so long as the UE is in the idle mode, PSM, eDRX mode or DRX mode.

Uplink SPS Procedure

Under a proposed scheme in accordance with the present disclosure, an UL SPS procedure for EDT may be re-used from the point of view of RRC with additions to control or inhibit the transition between idle mode and connected mode. Under the proposed scheme, SPS resources for SPS in idle mode may be fully configured by RRC. Under the proposed scheme, a radio network temporary identifier (RNTI) may be configured for the UE as there is no possibility to provide a cell RNTI (C-RNTI) in the RAR from the network to the UE.

M2M SPS Resource Configuration

Under a proposed scheme in accordance with the present disclosure, one or more M2M SPS resources may be configured dedicatedly for a UE having a traffic pattern that is quite regular and deterministic (e.g., the report from meters every 12 hours or 24 hours). That is, the UE may transmit UL data in a skipUplink manner, i.e., the UE skips UL transmissions for a configured uplink grant if no data is available for transmission in the UE buffer. Under the proposed scheme, M2M SPS resource(s) may be configured to be shared among a group of UEs. For instance, collision may happen when more than one UE transmit in the common resource. Under the proposed scheme, UE identification may be transmitted in the M2M SPS for UE differentiation. In an event that contention resolution is not received, re-transmission or fallback to a legacy RACH mechanism may be applied.

Illustrative Implementations

Figure 3:
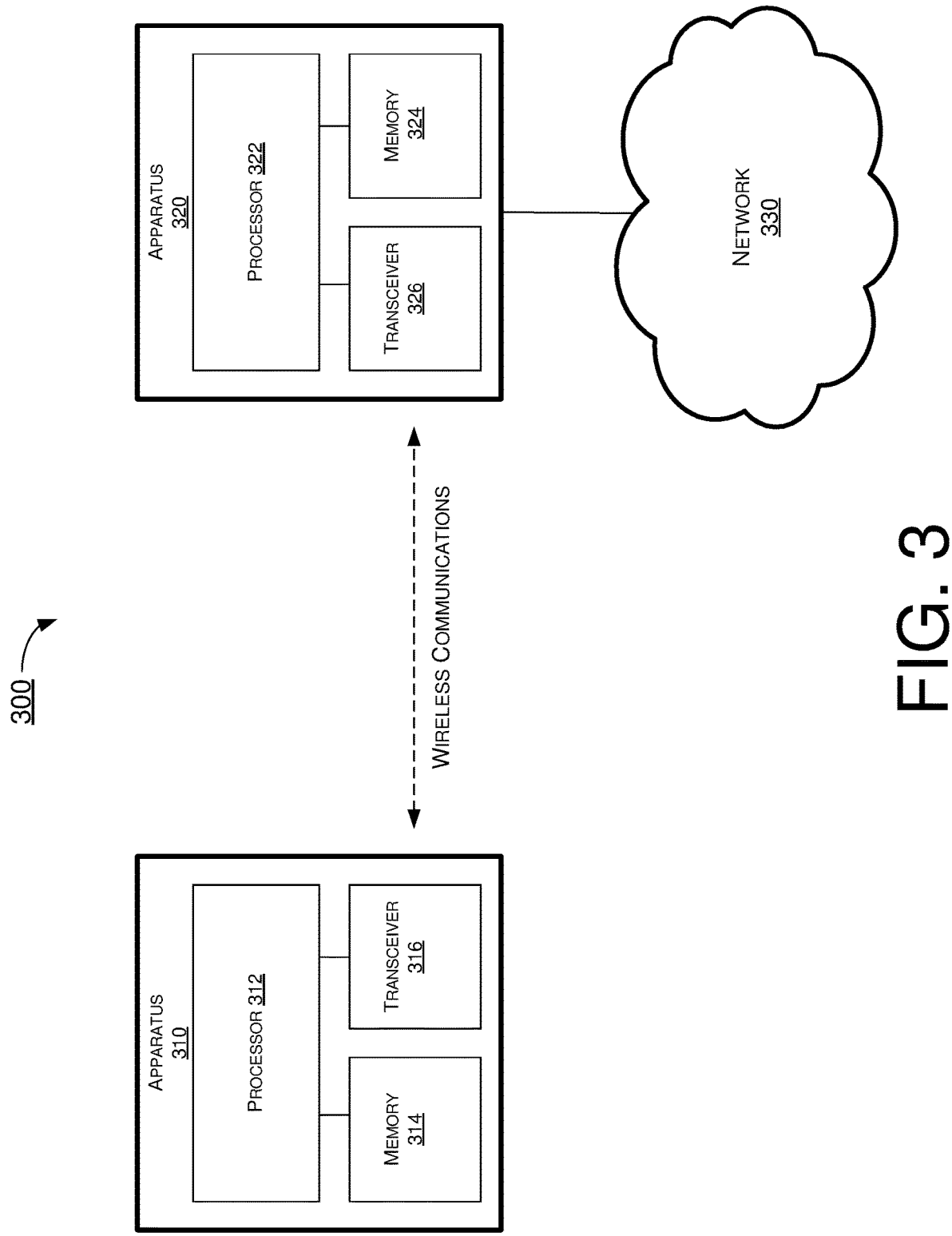
FIG. 3 is a block diagram of an example communication environment in accordance with an implementation of the present disclosure.

FIG. 3 illustrates an example communication environment 300 having an example apparatus 310 and an example apparatus 320 in accordance with an implementation of the present disclosure. Each of apparatus 310 and apparatus 320 may perform various functions to implement schemes, techniques, processes and methods described herein pertaining to M2M semi-persistent scheduling in wireless communications for reduction in signaling overhead and improvement in system performance, including various schemes described above as well as process 400 described below.

Each of apparatus 310 and apparatus 320 may be a part of an electronic apparatus, which may be a UE such as a portable or mobile apparatus, a wearable apparatus, a wireless communication apparatus or a computing apparatus. For instance, each of apparatus 310 and apparatus 320 may be implemented in a smartphone, a smartwatch, a personal digital assistant, a digital camera, or a computing equipment such as a tablet computer, a laptop computer or a notebook computer. Each of apparatus 310 and apparatus 320 may also be a part of a machine type apparatus, which may be an IoT or NB-IoT apparatus such as an immobile or a stationary apparatus, a home apparatus, a wire communication apparatus or a computing apparatus. For instance, each of apparatus 310 and apparatus 320 may be implemented in a smart thermostat, a smart fridge, a smart door lock, a wireless speaker or a home control center. Alternatively, each of apparatus 310 and apparatus 320 may be implemented in the form of one or more integrated-circuit (IC) chips such as, for example and without limitation, one or more single-core processors, one or more multi-core processors, or one or more complex-instruction-set-computing (CISC) processors. Each of apparatus 310 and apparatus 320 may include at least some of those components shown in FIG. 3 such as a processor 312 and a processor 322, respectively. Each of apparatus 310 and apparatus 320 may further include one or more other components not pertinent to the proposed scheme of the present disclosure (e.g., internal power supply, display device and/or user interface device), and, thus, such component(s) of each of apparatus 310 and apparatus 320 are neither shown in FIG. 3 nor described below in the interest of simplicity and brevity.

In some implementations, at least one of apparatus 310 and apparatus 320 may be a part of an electronic apparatus, which may be a network node such as a transmit/receive point (TRP), a base station, a small cell, a router or a gateway. For instance, at least one of apparatus 310 and apparatus 320 may be implemented in an eNodeB in an LTE, LTE-Advanced or LTE-Advanced Pro network or in a gNB in a 5G, NR, IoT or NB-IoT network. Alternatively, at least one of apparatus 310 and apparatus 320 may be implemented in the form of one or more IC chips such as, for example and without limitation, one or more single-core processors, one or more multi-core processors, or one or more CISC processors.

In one aspect, each of processor 312 and processor 322 may be implemented in the form of one or more single-core processors, one or more multi-core processors, or one or more CISC processors. That is, even though a singular term "a processor" is used herein to refer to processor 312 and processor 322, each of processor 312 and processor 322 may include multiple processors in some implementations and a single processor in other implementations in accordance with the present disclosure. In another aspect, each of processor 312 and processor 322 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 312 and processor 322 is a special-purpose machine specifically designed, arranged and configured to perform specific tasks including M2M semi-persistent scheduling for reduction in signaling overhead and improved system performance in accordance with various implementations of the present disclosure.

In some implementations, apparatus 310 may also include a transceiver 316 coupled to processor 312 and capable of wirelessly transmitting and receiving data, information and signals. In some implementations, apparatus 310 may further include a memory 314 coupled to processor 312 and capable of being accessed by processor 312 and storing data therein. In some implementations, apparatus 320 may also include a transceiver 326 coupled to processor 322 and capable of wirelessly transmitting and receiving data, information and signals. In some implementations, apparatus 320 may further include a memory 324 coupled to processor 322 and capable of being accessed by processor 322 and storing data therein. Accordingly, apparatus 310 and apparatus 320 may wirelessly communicate with each other via transceiver 316 and transceiver 326, respectively.

To aid better understanding, the following description of the operations, functionalities and capabilities of each of apparatus 310 and apparatus 320 is provided in the context of a mobile communication environment in which apparatus 310 is implemented in or as a wireless communication device, a communication apparatus or a UE and apparatus 320 is implemented in or as a network node (e.g., base station) of a wireless network 330.

Under various schemes in accordance with the present disclosure, processor 312 of apparatus 310 may receive, via transceiver 316, a control signal from apparatus 320. Moreover, processor 312 may apply, based on the control signal, an SPS configuration such that apparatus 310 enters one of one or more low-power modes between two adjacent SPS occasions.

In some implementations, the one or more low-power modes may include one or more of an idle mode, a PSM and/or an eDRX mode and/or a DRX mode.

In some implementations, in applying the SPS configuration processor 312 may perform a number of operations. For instance, processor 312 may determine whether the SPS configuration is valid. Moreover, responsive to the determining indicating that the SPS configuration is valid, processor 312 may postpone a transition from the one of the one or more low-power modes to a connected mode until a next SPS occasion.

In some implementations, in determining whether the SPS configuration is valid processor 312 may receive, via transceiver 316, RRC signaling from apparatus 320 indicating whether or not the SPS configuration is valid. Alternatively, in determining whether the SPS configuration is valid processor 312 may determine whether the SPS configuration is valid based on a NAS cause value.

In some implementations, in applying the SPS configuration processor 312 may maintain a TA timer that increments a TA validity value when in an idle mode among the of one or more low-power modes.

In some implementations, in applying the SPS configuration processor 312 may extend a value of a H-SFN to cover a periodicity of the SPS. In some implementations, in extending the value of the H-SFN processor 312 may receive, from apparatus 320 via transceiver 316, dedicated signaling specifically for apparatus 310 indicating H-SFN extension bits for extending the value of the H-SFN. Alternatively, in extending the value of the H-SFN processor 312 may receive, from apparatus 320 via transceiver 316, a system information block (SIB) indicating H-SFN extension bits for extending the value of the H-SFN.

In some implementations, processor 312 may receive, via transceiver 316, RRC signaling from apparatus 320. Additionally, processor 312 may configure one or more SPS resources based on the RRC signaling. In such cases, the RRC signaling may indicate a C-RNTI. Moreover, the SPS configuration may schedule retransmissions and define one or more parameters regarding staying in a connected mode.

In some implementations, processor 312 may determine whether to disable the SPS configuration based on one or more conditions. Moreover, processor 312 may disable the SPS configuration responsive to the determining indicating at least one of the one or more conditions being met. In some implementations, the one or more conditions may include one or more of the following: (a) a transition from the one of the one or more low-power modes to a connected mode, (b) an occurrence of an SPS occasion, (c) apparatus 310 moving to another cell different from a cell of which apparatus 320 is a part, (d) apparatus 310 moving to a coverage situation not supported by one or more resources configured by the SPS configuration, and (f) expiration of a TA timer.

In some implementations, processor 312 may transmit, via transceiver 316, information associated with the SPS configuration to apparatus 320 upon connection to apparatus 320 after disabling the SPS configuration. In some implementations, the information associated with the SPS configuration may include an ID of the cell or apparatus 320, a RNTI, an ID of apparatus 310, a configuration ID of the SPS configuration, or a combination thereof.

In some implementations, processor 312 may transmit, via transceiver 316, UL data in an M2M SPS resource in a skipUplink manner. In some implementations, the SPS configuration configures the M2M SPS resource dedicatedly for apparatus 310 or to be shared among a group of UEs including apparatus 310.

In some implementations, processor 312 may preempt an M2M SPS transmission and perform, via transceiver 316, a predetermined type of transmission using normal access by a RACH. In some implementations, the predetermined type of transmission may include an urgent transmission, a high-priority transmission or an irregular transmission. For instance, the predetermined type of transmission may be for high-priority alarm(s).

Illustrative Processes

Figure 4:
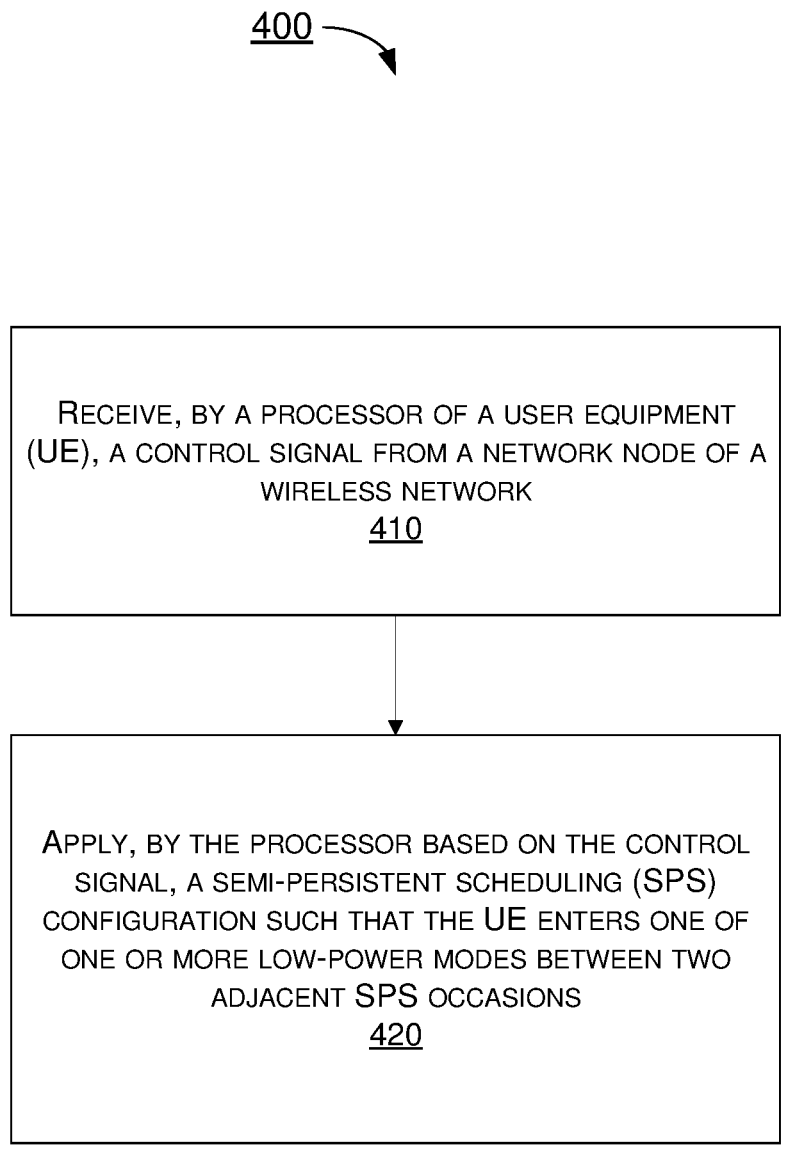
FIG. 4 is a flowchart of an example process in accordance with an implementation of the present disclosure.

FIG. 4 illustrates an example process 400 in accordance with an implementation of the present disclosure. Process 400 may be an example implementation of the proposed schemes described above with respect to M2M semi-persistent scheduling in accordance with the present disclosure. Process 400 may represent an aspect of implementation of features of apparatus 310 and apparatus 320. Process 400 may include one or more operations, actions, or functions as illustrated by one or more of blocks 410 and 420. Although illustrated as discrete blocks, various blocks of process 400 may be divided into additional blocks, combined into fewer blocks, or eliminated, depending on the desired implementation. Moreover, the blocks of process 400 may executed in the order shown in FIG. 4 or, alternatively, in a different order. Process 400 may also be repeated partially or entirely. Process 400 may be implemented by apparatus 310, apparatus 320 and/or any suitable wireless communication device, UE, base station or machine type devices. Solely for illustrative purposes and without limitation, process 400 is described below in the context of apparatus 310 as a UE and apparatus 320 as a network node (e.g., base station such as a gNB) of a wireless network (e.g., 5G/NR mobile network). Process 400 may begin at block 410.

At 410, process 400 may involve processor 312 of apparatus 310 as a UE receiving, via transceiver 316, a control signal from apparatus 320 as a network node. Process 400 may proceed from 410 to 420.

At 420, process 400 may involve processor 312 applying, based on the control signal, an SPS configuration such that apparatus 310 enters one of one or more low-power modes between two adjacent SPS occasions.

In some implementations, the one or more low-power modes may include one or more of an idle mode, a PSM, an eDRX mode and a DRX mode.

In some implementations, in applying the SPS configuration process 400 may involve processor 312 performing a number of operations. For instance, process 400 may involve processor 312 determining whether the SPS configuration is valid. Moreover, responsive to the determining indicating that the SPS configuration is valid, process 400 may involve processor 312 postponing a transition from the one of the one or more low-power modes to a connected mode until a next SPS occasion.

In some implementations, in determining whether the SPS configuration is valid process 400 may involve processor 312 receiving, via transceiver 316, RRC signaling from apparatus 320 indicating whether or not the SPS configuration is valid. Alternatively, in determining whether the SPS configuration is valid process 400 may involve processor 312 determining whether the SPS configuration is valid based on a NAS cause value.

In some implementations, in applying the SPS configuration process 400 may involve processor 312 maintaining a TA timer that increments a TA validity value when in an idle mode among the of one or more low-power modes.

In some implementations, in applying the SPS configuration process 400 may involve processor 312 extending a value of a H-SFN to cover a periodicity of the SPS. In some implementations, in extending the value of the H-SFN process 400 may involve processor 312 receiving, from apparatus 320 via transceiver 316, dedicated signaling specifically for apparatus 310 indicating H-SFN extension bits for extending the value of the H-SFN. Alternatively, in extending the value of the H-SFN process 400 may involve processor 312 receiving, from apparatus 320 via transceiver 316, a system information block (SIB) indicating H-SFN extension bits for extending the value of the H-SFN.

In some implementations, process 400 may involve processor 312 performing additional operations. For instance, process 400 may involve processor 312 receiving, via transceiver 316, RRC signaling from apparatus 320. Additionally, process 400 may involve processor 312 configuring one or more SPS resources based on the RRC signaling. In such cases, the RRC signaling may indicate a C-RNTI. Moreover, the SPS configuration may schedule retransmissions and define one or more parameters regarding staying in a connected mode.

In some implementations, process 400 may involve processor 312 performing additional operations. For instance, process 400 may involve processor 312 determining whether to disable the SPS configuration based on one or more conditions. Moreover, process 400 may involve processor 312 disabling the SPS configuration responsive to the determining indicating at least one of the one or more conditions being met. In some implementations, the one or more conditions may include one or more of the following: (a) a transition from the one of the one or more low-power modes to a connected mode, (b) an occurrence of an SPS occasion, (c) apparatus 310 moving to another cell different from a cell of which apparatus 320 is a part, (d) apparatus 310 moving to a coverage situation not supported by one or more resources configured by the SPS configuration, and (f) expiration of a TA timer.

In some implementations, process 400 may further involve processor 312 transmitting, via transceiver 316, information associated with the SPS configuration to apparatus 320 upon connection to apparatus 320 after disabling the SPS configuration. In some implementations, the information associated with the SPS configuration may include an ID of the cell or apparatus 320, a RNTI, an ID of apparatus 310, a configuration ID of the SPS configuration, or a combination thereof.

In some implementations, process 400 may further involve processor 312 transmitting, via transceiver 316, UL data in an M2M SPS resource in a skipUplink manner. In some implementations, the SPS configuration configures the M2M SPS resource dedicatedly for apparatus 310 or to be shared among a group of UEs including apparatus 310.

In some implementations, process 400 may further involve processor 312 performing additional operations. For instance, process 400 may involve processor 312 preempting an M2M SPS transmission. Moreover, process 400 may involve processor 312 performing, via transceiver 316, a predetermined type of transmission using normal access by a RACH. In some implementations, the predetermined type of transmission may include an urgent transmission, a high-priority transmission or an irregular transmission. For instance, the predetermined type of transmission may be for high-priority alarm(s).

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   receiving, by a processor of a user equipment (UE), a control signal from a network node of a wireless network; and
   applying, by the processor based on the control signal, a semi-persistent scheduling (SPS) configuration such that the UE enters one of one or more low-power modes between two adjacent SPS occasions.

2. The method of claim 1, wherein the one or more low-power modes comprise one or more of an idle mode, a power-saving mode (PSM), an extended discontinuous reception (eDRX) mode and a DRX mode.

3. The method of claim 1, wherein the applying of the SPS configuration comprises:
   determining whether the SPS configuration is valid; and
   responsive to the determining indicating that the SPS configuration is valid, postponing a transition from the one of the one or more low-power modes to a connected mode until a next SPS occasion.

4. The method of claim 3, wherein the determining of whether the SPS configuration is valid comprises receiving radio resource control (RRC) signaling from the network node indicating whether or not the SPS configuration is valid.

5. The method of claim 3, wherein the determining of whether the SPS configuration is valid comprises determining whether the SPS configuration is valid based on a non-access stratum (NAS) cause value.

6. The method of claim 1, wherein the applying of the SPS configuration comprises:
   maintaining a timing advance (TA) timer that increments a TA validity value when in an idle mode among the of one or more low-power modes.

7. The method of claim 1, wherein the applying of the SPS configuration comprises:
   extending a value of a hyper-system frame number (H-SFN) to cover a periodicity of the SPS.

8. The method of claim 7, wherein the extending of the value of the H-SFN comprises:
   receiving, from the network node, dedicated signaling specifically for the UE indicating H-SFN extension bits for extending the value of the H-SFN.

9. The method of claim 7, wherein the extending of the value of the H-SFN comprises:
   receiving, from the network node, a system information block (SIB) indicating H-SFN extension bits for extending the value of the H-SFN.

10. The method of claim 1, further comprising:
    receiving, by the processor, radio resource control (RRC) signaling from the network node; and
    configuring, by the processor, one or more SPS resources based on the RRC signaling,
    wherein the RRC signaling indicates a cell radio network temporary identifier (C-RNTI), and
    wherein the SPS configuration schedules retransmissions and defines one or more parameters regarding staying in a connected mode.

11. The method of claim 1, further comprising:
    determining, by the processor, whether to disable the SPS configuration based on one or more conditions; and
    disabling, by the processor, the SPS configuration responsive to the determining indicating at least one of the one or more conditions being met,
    wherein the one or more conditions comprise one or more of:
    a transition from the one of the one or more low-power modes to a connected mode,
    an occurrence of an SPS occasion,
    the UE moving to another cell different from a cell of which the network node is a part,
    the UE moving to a coverage situation not supported by one or more resources configured by the SPS configuration, and
    expiration of a timing advance (TA) timer.

12. The method of claim 11, further comprising:
    transmitting, by the processor, information associated with the SPS configuration to the network node upon connection to the network node after disabling the SPS configuration,
    wherein the information associated with the SPS configuration comprises an identify (ID) of the cell or the network node, a radio network temporary identifier (RNTI), an ID of the UE, a configuration ID of the SPS configuration, or a combination thereof.

13. The method of claim 1, further comprising:
transmitting, by the processor, uplink (UL) data in a machine-to-machine (M2M) SPS resource in a skipUplink manner.

14. The method of claim 13, wherein the SPS configuration configures the M2M SPS resource dedicatedly for the UE or to be shared among a group of UEs.

15. The method of claim 1, further comprising:
preempting, by the processor, a machine-to-machine (M2M) SPS transmission; and
performing, by the processor, a predetermined type of transmission using normal access by a random access channel (RACH),
wherein the predetermined type of transmission comprises an urgent transmission, a high-priority transmission or an irregular transmission.

16. An apparatus, comprising:
a transceiver capable of wirelessly communicating with a network node of a wireless network; and
a processor coupled to the transceiver, the processor capable of:
receiving, via the transceiver, a control signal from the network node; and
applying, based on the control signal, a semi-persistent scheduling (SPS) configuration such that the apparatus enters one of one or more low-power modes between two adjacent SPS occasions,
wherein the one or more low-power modes comprise one or more of an idle mode, a power-saving mode (PSM), an extended discontinuous reception (eDRX) mode and a DRX mode.

17. The apparatus of claim 16, wherein in applying the SPS configuration the processor is capable of:
determining whether the SPS configuration is valid; and
responsive to the determining indicating that the SPS configuration is valid, postponing a transition from the one of the one or more low-power modes to a connected mode until a next SPS occasion,
wherein in determining whether the SPS configuration is valid the processor is capable of either:
receiving radio resource control (RRC) signaling from the network node indicating whether or not the SPS configuration is valid; or
determining whether the SPS configuration is valid based on a non-access stratum (NAS) cause value.

18. The apparatus of claim 16, wherein in applying the SPS configuration the processor is capable of performing either a first procedure or a second procedure, and wherein:
the first procedure involves maintaining a timing advance (TA) timer that increments a TA validity value when in an idle mode among the of one or more low-power modes,
the second procedure involves extending a value of a hyper-system frame number (H-SFN) to cover a periodicity of the SPS,
in extending the value of the H-SFN the processor is capable of either:
receiving, via the transceiver from the network node, dedicated signaling specifically for the apparatus indicating H-SFN extension bits for extending the value of the H-SFN; or
receiving, via the transceiver from the network node, a system information block (SIB) indicating H-SFN extension bits for extending the value of the H-SFN.

19. The apparatus of claim 16, wherein the processor is further capable of:
receiving, via the transceiver, radio resource control (RRC) signaling from the network node; and
configuring one or more SPS resources based on the RRC signaling,
wherein the RRC signaling indicates a cell radio network temporary identifier (C-RNTI), and
wherein the SPS configuration schedules retransmissions and defines one or more parameters regarding staying in a connected mode.

20. The apparatus of claim 16, wherein the processor is further capable of:
determining whether to disable the SPS configuration based on one or more conditions;
disabling the SPS configuration responsive to the determining indicating at least one of the one or more conditions being met; and
transmitting, via the transceiver, information associated with the SPS configuration to the network node upon connection to the network node after disabling the SPS configuration,
wherein the information associated with the SPS configuration comprises an identify (ID) of the cell or the network node, a radio network temporary identifier (RNTI), an ID of the apparatus, a configuration ID of the SPS configuration, or a combination thereof, and
wherein the one or more conditions comprise one or more of:
a transition from the one of the one or more low-power modes to a connected mode,
an occurrence of an SPS occasion,
the apparatus moving to another cell different from a cell of which the network node is a part,
the apparatus moving to a coverage situation not supported by one or more resources configured by the SPS configuration, and
expiration of a timing advance (TA) timer.

* * * * *